United States Patent
Muniandy et al.

(10) Patent No.: US 7,394,274 B2
(45) Date of Patent: Jul. 1, 2008

(54) ON-CHIP FREQUENCY DEGRADATION COMPENSATION

(75) Inventors: Ravisangar Muniandy, Pulau Pinang (MY); Gregory F. Taylor, Portland, OR (US); Payman Aminzadeh, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/879,645

(22) Filed: Jul. 17, 2007

(65) Prior Publication Data

US 2007/0257697 A1 Nov. 8, 2007

Related U.S. Application Data

(62) Division of application No. 10/751,132, filed on Dec. 31, 2003, now Pat. No. 7,282,937.

(51) Int. Cl.
*G01R 31/26* (2006.01)
(52) U.S. Cl. .................. 324/763; 324/765
(58) Field of Classification Search .......... None
See application file for complete search history.

(56) References Cited

U.S. PATENT DOCUMENTS

| 6,535,013 | B2 | 3/2003 | Samaan |
| 6,724,214 | B2 | 4/2004 | Manna et al. |
| 6,724,268 | B2 | 4/2004 | Takahashi |
| 6,806,698 | B2 | 10/2004 | Gauthier et al. |
| 6,903,564 | B1 | 6/2005 | Suzuki |
| 2005/0134394 | A1 | 6/2005 | Liu |
| 2005/0140418 | A1 | 6/2005 | Muniandy et al. |
| 2006/0223201 | A1 | 10/2006 | Liu et al. |

OTHER PUBLICATIONS

Office Action mailed Apr. 18, 2006 in co-pending U.S. Appl. No. 10/745,427.

*Primary Examiner*—Minh N Tang
(74) *Attorney, Agent, or Firm*—Blakely, Sokoloff, Taylor & Zafman LLP

(57) ABSTRACT

Embodiments of the invention include a trio of reliability oscillators. In one embodiment, an on-chip frequency compensation circuit includes a selectively enabled reliability oscillator to generate a reference oscillating signal, a clocked reliability oscillator to generate an AC degraded oscillating signal, and a static reliability oscillator to generate a DC bias degraded oscillating signal. A compare circuit coupled to the reliability oscillators compares the oscillating signals and generates a frequency compensation signal if the comparison determines that there is frequency degradation greater than a predetermined threshold.

18 Claims, 5 Drawing Sheets

ON-CHIP FREQUENCY DEGRADATION COMPENSATION

PRIORITY

This application is a divisional application of Application Ser. No. 10/751,132, filed Dec. 31, 2003, which is presently issued as U.S. Patent No. 7,282,937, which is assigned to the assignee of the present application.

FIELD OF THE INVENTION

Embodiments of the invention relate generally to on chip testing for integrated circuit reliability and quality assurance, and specifically to on-chip clock frequency compensation for transistor degradation.

BACKGROUND OF THE INVENTION

Over time, a semiconductor integrated circuit may become aged and experience higher resistances and lower drive capabilities in its transistors. These effects have become more pronounced as semiconductor integrated circuits have been scaled down.

To compensate for the aging effects, a frequency guard band has been used during testing of a new integrated circuit that was recently manufactured. That is, the integrated circuit is tested to operate with a clock rate at a percentage guard band (GB) above the rated frequency. The percentage GB is predetermined through experiments performed during process development. In this manner if the integrated circuit ages accordingly, it has a higher operating probability over time.

However, not all integrated circuits age in accordance with experiments performed during process development. There is still a small probability that new integrated circuits, with a guard banded frequency rating, will fail as they age. That is, these circuits may fail because they experience greater than expected aging.

A typical consumer integrated circuit may last seven years, at which point, one percent of their cumulative totals may have experienced catastrophic failure due to the unexpected degradation of their maximum operating frequencies, Fmax.

Moreover, some new integrated circuits are robust and can be operated at frequencies greater than the rated operating frequency without ever failing over time. In this case, guard banding the frequency of the integrated circuit to a rated operating frequency is inefficient, as lower than expected aging may occur. These new integrated circuits are never utilized to the extent of their capabilities. The experiments performed during process development to determine the percentage GB for guard banding do not actually reflect how an integrated circuit is used in a system.

DETAILED DESCRIPTION

Figure 1:
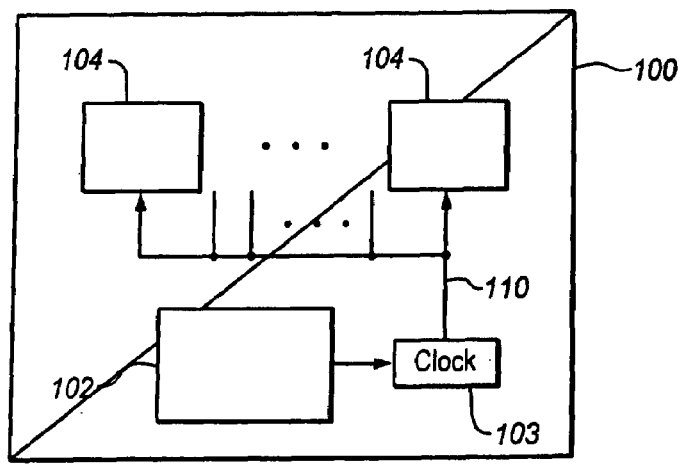
FIG. 1 illustrates a block diagram of an integrated circuit including an integrated on-chip frequency compensation block as one embodiment of the invention.

In the following detailed description of embodiments of the invention, numerous specific details are set forth in order to provide a thorough understanding of the invention. However, it will be obvious to one skilled in the art that the embodiments of the invention may be practiced without these specific details. In other instances well known methods, procedures, components, and circuits have not been described in detail so as not to unnecessarily obscure aspects of the embodiments of the invention.

A compensation circuit adjusts the core clock frequency of an integrated circuit to account for real time frequency degradation due to transistor drive current reduction as time passes. By adjusting the core clock frequency of the integrated circuit, product failure may be avoided. The transistor driver current reduces over time as an integrated circuit is used due to known phenomenon caused by p-channel metal oxide semiconductor (PMOS) and n-channel metal oxide semiconductor (NMOS) charge trapping.

Data comparisons between actual product frequency degradation closely correlate to frequency degradation in a ring oscillator. The compensation circuit measures the frequency degradation by comparing frequency performance of a DC biased ring oscillator, an AC biased ring oscillator, and an unbiased ring oscillator within the integrated circuit die. The compensation circuit may take these measurements and perform the comparison when the integrated circuit is first powered up or periodically after a time period has passed. If the measurements and comparisons indicate frequency degradation greater than a frequency guard band, the core clock frequency is adjusted. In one embodiment, a new clock ratio (core clock to front-side bus ratio) is provided to compensate for the degradation. In this manner, the compensation circuit compensates for actual in-use Fmax degradation, improves the overall reliability of the integrated circuit, and provides an opportunity to reduce the frequency guard-bands so that more parts may be sold to operate at higher frequencies.

In one embodiment, an integrated circuit has one or more functional blocks to perform one or more functions and an on-chip frequency compensation circuit. The on-chip frequency compensation circuit includes a selectively enabled reliability oscillator to generate a reference oscillating signal, a clocked reliability oscillator to generate an AC degraded oscillating signal, a static reliability oscillator to generate a DC bias degraded oscillating signal, and a compare circuit coupled to the reliability oscillators to compare the oscillating signals and generate a frequency compensation signal in response to the comparison being greater than a predetermined threshold.

In another embodiment, the on-chip frequency compensation circuit includes a first reliability oscillator, a second reliability oscillator, a third reliability oscillator, a first counter, a second counter, and a third counter. The first reliability oscillator has a selectively powered on ring oscillator to avoid transistor degradation and generates a reference oscillating signal on a first oscillation output. The second reliability oscillator includes a constantly powered clocked ring oscillator to experience AC dynamic transistor degradation and generates an AC degraded oscillating signal on a second oscillation output. The third reliability oscillator includes a constantly powered static ring oscillator to experience DC static transistor degradation and generates a DC bias degraded oscillating signal on a third oscillation output. The first counter has an input coupled to the first oscillation output and generates a reference count on a first count output. The second counter has an input coupled to the second oscillation output and generates a dynamic count on a second count output. The third counter has an input coupled to the third oscillation output and generates a static count on a third count output.

In another embodiment a method in an integrated circuit is disclosed. The method includes enabling measurement of ring oscillator frequencies of a trio of ring oscillators, measuring a first frequency of a first ring oscillator having dynamically stressed transistors, measuring a second frequency of a second ring oscillator having statically stressed transistors, measuring a third frequency of a third ring oscillator having non-stressed transistors, and comparing the first frequency with the third frequency and the second frequency with the third frequency to determine a measure of transistor degradation.

In yet another embodiment, a microprocessor integrated circuit includes an execution unit to execute instructions; and an integrated on-chip frequency compensation circuit. The integrated on-chip frequency compensation circuit has a reference reliability oscillator to selectively generate a reference oscillating signal, a dynamic reliability oscillator to selectively generate an AC degraded oscillating signal, a static reliability oscillator to selectively generate a DC degraded oscillating signal, a measurement and comparison circuit coupled to the reliability oscillators, the measurement and comparison circuit to receive the reference oscillating signal and the AC degraded oscillating signal to generate a first measure of transistor degradation, the measurement and comparison circuit to receive the reference oscillating signal and the DC degraded oscillating signal to generate a second measure of transistor degradation.

Referring now to FIG. 1, a monolithic integrated circuit chip 100 is illustrated as one embodiment of the invention. The integrated circuit 100 includes on-chip frequency compensation circuitry 102, a clock generator 103, and one or more functional circuits 104. The on-chip frequency compensation circuitry 102 is integrated on-chip as part of a monolithic substrate and includes reliability oscillators to perform a characterization of transistor degradation. The on-chip frequency compensation circuitry 102 couples to the clock generator 103. The clock generator 103 couples a clock signal 110 which is coupled to the one or more functional circuits 104. As discussed further below, the integrated circuit 100 may include one or more functional blocks, such as an execution unit for example, and in which case the integrated circuit may be a microprocessor integrated circuit.

The on-chip frequency compensation circuitry 102 may provide a signal to the clock generator 103 to modify an oscillating frequency of a frequency synthesizer or a division ratio of a clock divider. In any case, the on-chip frequency compensation circuitry 102 may alter the frequency of the clock signal generated by the clock generator 103 in order to compensate for transistor degradation and thereby improve the reliability and avoid failure of the integrated circuit over time.

Figure 2:
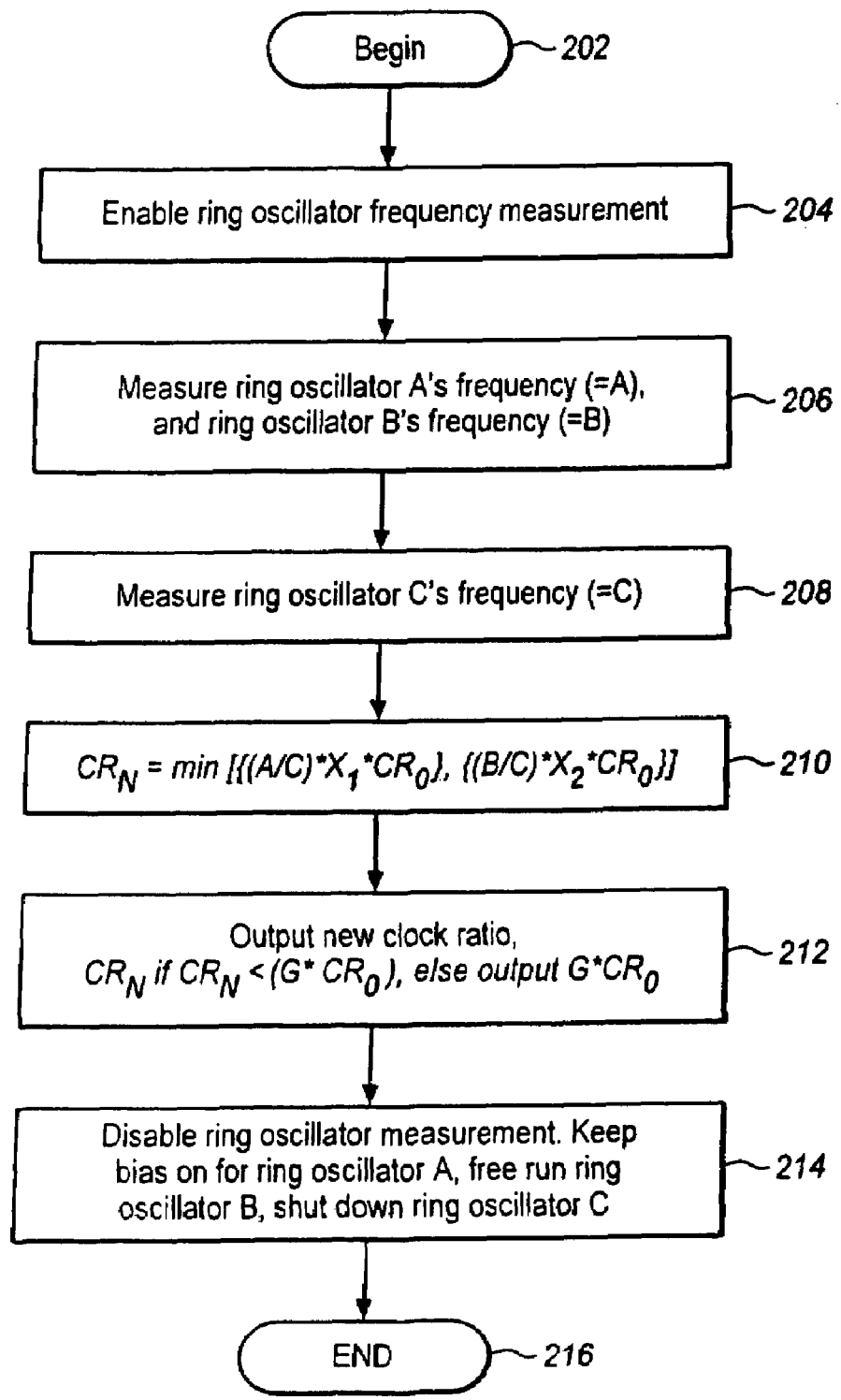
FIG. 2 illustrates a flow chart diagram of the process to provide frequency degradation measurement and compensation as one embodiment of the invention.

Referring now to FIG. 2, a flow chart of the process to provide frequency degradation measurement and compensation is illustrated.

At block 202, the process begins such as upon power-up of the integrated circuit and periodically, after the integrated circuit has been powered-up for a predetermined period of time. For example consider that the integrated circuit is a microprocessor, the degradation measurement and frequency compensation is done every time the microprocessor is powered-up and can be done periodically (e.g. once a day) thereafter.

Figure 3:
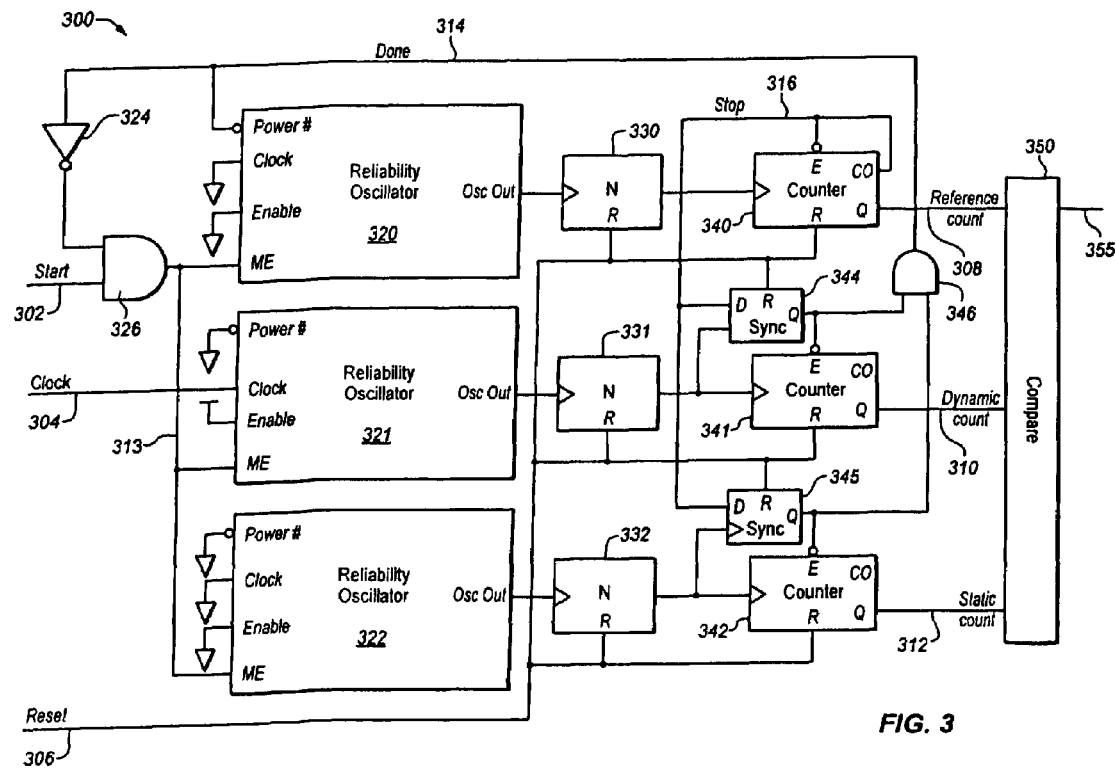
FIG. 3 illustrates a functional block diagram of the integrated on-chip frequency degradation measurement circuit to provide on chip frequency degradation compensation.

At block 204, ring oscillator frequency measurement is enabled. A trio of ring oscillator circuits may be used to determine frequency degradation. FIG. 3 illustrates reliability oscillators 320-333 each including a ring oscillator. Two of the trio of ring oscillator circuits, referred to as ring oscillator A and ring oscillator B, are placed under stress while the integrated circuit is powered up. Ring oscillator A receives a DC bias stress without any AC bias stress. That is, ring oscillator A is powered-up in a static state when the integrated circuit is powered up in order to experience a DC bias stress. Ring oscillator B receives an AC bias stress. That is, ring oscillator B is powered-up and is toggled from one logic state to another when the integrated circuit is powered up in order to experience a AC bias stress. The third of the trio of ring oscillator circuits, referred to as ring oscillator C, is used as a reference ring oscillator. Ring oscillator C, the reference ring oscillator, avoids both of the AC bias stress and the DC bias stress. That is, ring oscillator C is only powered-up when the frequency measurement is enabled. This avoids the AC bias stress and the DC bias stress from being applied to ring oscillator C, the reference ring oscillator.

At block 206, ring oscillator A's output frequency ("A") is measured and ring oscillator B's output frequency ("B") is measured. Because it receives DC bias stress only, ring oscillator A measures the frequency degradation due to DC bias ("DC bias frequency degradation"). Because it receives AC bias stress, ring oscillator B measures the frequency degradation due to AC bias ("AC bias frequency degradation"). Known methods of measuring the frequency of a ring oscillator may be used to measure ring oscillator A's output frequency ("A") and ring oscillator B's output frequency ("B"), such as that exemplified in U.S. Pat. No. 6,535,013 by Samie B. Samaan, filed Dec. 28, 2000.

At block 208, ring oscillator C's output frequency ("C") is measured. Ring oscillator C, the reference ring oscillator, is unbiased when the integrated circuit is powered-up but for the short time when this measurement is taken. Thus, ring oscillator C measures no frequency degradation from AC bias or DC bias. That is, the oscillating frequency output from the reference ring oscillator, ring oscillator C, is without frequency degradation and exemplifies a fresh circuit when the integrated circuit was first manufactured. Known methods of measuring the frequency of a ring oscillator may be used to measure ring oscillator C's output frequency ("C"), such as that exemplified in U.S. Pat. No. 6,535,013 by Samie B. Samaan, filed Dec. 28, 2000.

Frequency degradation is evident when the measured frequencies ("A", "B") of either ring oscillator A or ring oscillator B is less than the measured frequency ("C") of ring oscillator C.

At block 210, AC bias frequency degradation is compared with DC bias frequency degradation. The greater frequency degradation may then be used to determine a new clock ratio $CR_N$.

A ratio (A/C) of ring oscillator A's output frequency ("A") to ring oscillator C's output frequency ("C") is determined. A ratio (B/C) of ring oscillator B's output frequency ("B") to ring oscillator C's output frequency ("C") is determined. Each ratio is multiplied together with an initial clock ratio $CR_0$. The initial clock ratio $CR_0$ is a clock ratio that is determined for the maximum operating frequency when the integrated circuit is fresh as it was recently manufactured. Then, correlation multipliers, $X_1$, $X_2$, are respectively multiplied to each value to account for a slope difference between frequency degradation experienced by the ring oscillators and the integrated circuit product. The final equation for ring oscillator A is $\{(A/C)*X_1 *CR_0\}$. The final equation for ring oscillator B is $\{(A/B)*X2 *CR_0\}$. Then the minimum of these two values may be used as the new clock ratio $CR_N$. These computations and comparisons may be determined by an execution unit within a microprocessor.

At block 212, the new clock ratio CRN is compared with a guard-banded initial clock ratio $(G*CR_0)$ where G is the guard band percentage. For example, a 5% guard band G would be 0.95 (1 minus 5%). If the new clock ratio CRN is within the guard-banded initial clock ratio $(G*CR_0)$ no change may occur. That is the actual clock ratio used by the clock generator 103 to generate a clock signal can remain the same. If the new clock ratio $CR_N$ is outside of the guard-banded initial clock ratio $(G*CR_0)$, then the new clock ratio $CR_N$ is output and used as the actual clock ratio by the clock generator 103 to generate the clock signal distributed to the one or more functional blocks 104. This comparison may also be determined by an execution unit within a microprocessor.

At block 214, ring oscillator frequency measurement is disabled. Ring oscillator A continues to receive a DC bias stress without any AC bias stress. Ring oscillator B switches at the clock frequency, matching the AC switching of the fastest nodes on the integrated circuit, and thus receives an AC bias stress. Ring oscillator C, the reference ring oscillator, is shut down by being disabled and powered-down so that it avoids both of the AC bias stress and the DC bias stress. In this manner, ring oscillators A and B experience frequency degradation similar to that of the functional blocks of the integrated circuit while ring oscillator C, the reference ring oscillator, is protected from degradation.

At block 216, the process ends until it begins again at block 202 when the integrated circuit is powered-up or a period of time has passed.

Referring now to FIG. 3, an embodiment of a frequency degradation measurement circuit 300 is illustrated. The frequency degradation measurement circuit 300 is integrated on-chip and may be included as a part of the on-chip compensation circuitry 102 previously described.

The frequency degradation measurement circuit 300 includes a trio of reliability oscillators 320-322, an inverter 324, an AND gate 326, a trio of prescalers (i.e., dividers) 330-332, a trio of counters 340-342, synchronizers 344-345, AND gate 346, and a compare circuit 350 coupled together as shown and illustrated in FIG. 3. A start signal 302, a clock signal 304, and a reset signal 306 are coupled into the frequency degradation measurement circuit 300. A reference count signal 308, a dynamic count signal 310, and a static count signal 312 are coupled into the compare circuit 350. In response to a comparison of the reference count signal 308, the dynamic count signal 310, and the static count signal 312, the compare circuit 350 may generate a frequency compensation signal 355. The frequency compensation signal 355 may be coupled into the clock generator 103 in order that the frequency of the clock signal 110 may be modified.

The circuits of the reliability oscillators 320-322 are substantially similar to each other. How the reliability oscillators 320-322 are connected in the frequency degradation measurement circuit 300 differs.

Note that while the flow chart of FIG. 2 shows that the measurement of reliability oscillators A and B is sequential with the measurement of oscillator C in blocks 206 and 208, all three oscillators may be measured at the same time by the circuit in FIG. 3. That is, the order of measurement of the ring oscillators is not critical.

Figure 4:
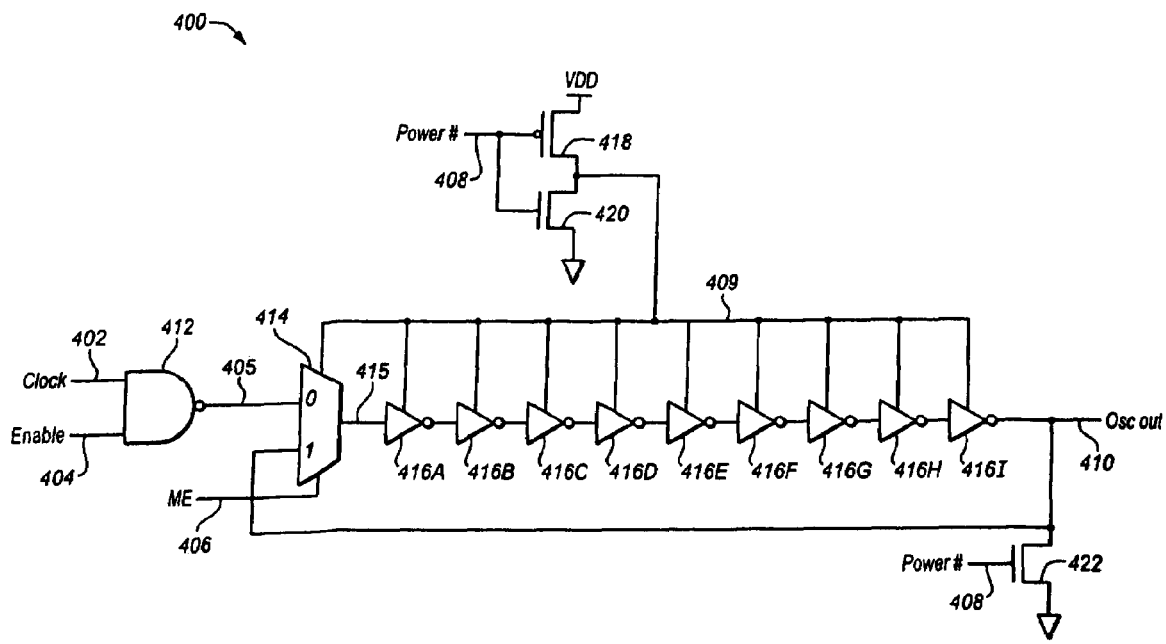
FIG. 4 illustrates a functional block diagram of an exemplary embodiment of a reliability oscillator.

Referring now to FIG. 4, an exemplary reliability oscillator 400 is illustrated. The reliability oscillator 400 includes an odd number of inverters connected in series to provide a ring oscillator. In this example, the reliability oscillator 400 includes nine inverters 416A-416I coupled in a series chain together. The reliability oscillator 400 further includes a NAND gate 412, a multiplexer 414, a p-channel field effect transistor (PFET) 418, an n-channel field effect transistor (NFET) 420, and another NFET 422 coupled together as shown and illustrated in FIG. 4.

The multiplexer 414 has a pair of inputs, one of which is coupled to an output 405 from the NAND gate 412 and another one coupled to an oscillation output (OSC Out) 410 from the last inverter 416I in the series. The output 415 of the multiplexer 414 couples to the input of the first inverter 416A in the series chain. The multiplexer 414 selects between an output 405 from the NAND gate 412 and an oscillation output (OSC Out) 410 from the last inverter 416I in the series in response to a measurement enable (ME) signal 406. When the ME signal 406 is logically high and power is enabled, the reliability oscillator 400 functions as a ring oscillator with the output of the last inverter 416I coupled into the input of the first inverter 416A in the odd series of inverters. When the ME signal 406 is logically low and power is enabled, the inverter chain in the reliability oscillator 400 may be toggled by the clock input signal 402 if enabled by the enable signal 404 being high. If the enable signal 404 is low, the output 405 of the NAND gate 412 is pulled logically high and no toggling occurs in response to the clock signal 402.

The odd number of inverters in the inverter chain (e.g., inverters 416A-416I) is used as a ring oscillator to measure device degradation. Instead of inverters, other types of logic gates may be used in the ring oscillator so that they are sized consistently with typical paths on the integrated circuit chip desirable to be monitored, as is the ring oscillator length. Generally, smaller devices are more subject to within die variation as are short chains of gates.

To avoid degradation in the transistors of the ring oscillator, the reliability oscillator 400 has power from the positive power supply or VDD switched into the chain of inverters 416A-416I and the multiplexer 414 in one embodiment. If power# 408, an active low signal, is high, PFET 418 is open and NFETs 420 and 422 are closed so that circuit node 409 is grounded through NFET 420 and the OSC Out 410 is grounded through NFET 422 to the negative power supply or VSS. In this manner, the transistors forming the chain of inverters 416A-416I avoid experiencing AC bias or DC bias degradation. If power# 408, an active low signal, is low, PFET 418 is closed and NFETs 420 and 422 are open so that circuit node 409 is coupled to the positive power supply VDD through PFET 418. With NFET 422 open, the OSC Out 410 may oscillate or be toggled.

In another embodiment, ground from the negative power supply or VSS may be switched into the chain of inverters 416A-416I and the multiplexer 414. In yet another embodiment, both ground from the negative power supply or VSS and power from the positive power supply or VDD may both be switched into the chain of inverters 416A-416I and the multiplexer 414. In either case when power is switched off, the transistors forming the chain of inverters 416A-416I avoid experiencing AC bias or DC bias degradation while other transistors in the integrated circuit are aged and experience degradation.

Logically, the exemplary reliability oscillator 400 can have four logical states with the inverter chain used in one of four ways.

State 1: With Power# being logically high, the logical states of the ME input and the enable input are don't cares. The ring oscillator is powered down so that there are no stresses (AC or DC) on the devices that are being measured.

State 2: Power# is logically low, ME is logically high, and the logical state of enable is don't care. The ring oscillator can be run so that its period can be measured.

State 3: Power# is logically low, ME is logically low, and the logical state of enable is low. In this state the oscillator is stopped, but a DC bias is maintained across the devices that are to be measured.

State 4: Power# is logically low, ME is logically low, and the logical state of enable is high. In this state the microprocessor clock may drive the inverter chain of inverters 416A-416I, subjecting it to the maximum AC stress that any circuit on the chip will experience.

Most of the time the three ring oscillators in the frequency degradation circuit are operated with one each in states 1, 3, and 4. This keeps the reference oscillator from degrading, while the other two oscillators are subject to maximum DC and AC degradation.

Referring back to FIG. 3, the reliability oscillators 320-322 are connected in the frequency degradation measurement circuit 300 differently, each of the reliability oscillators 320-322 being an instance of the reliability oscillator 400.

Reliability oscillator 320 is a reference oscillator. Reliability oscillator 320 has its power# input coupled to a done signal 314, its clock input coupled to ground, its enable input coupled to ground, and its measurement enable input (ME) coupled to a measure signal 313. The reliability oscillator 320 is selectively powered on by the done signal 314 when a measurement is to be taken of the reference oscillating frequency. With the clock input and the enable input being grounded, the reliability oscillator 320 does not receive AC bias stress from the clock signal 304.

Reliability oscillator 321 is an AC bias stressed oscillator. Reliability oscillator 321 has its power# input coupled to ground, its clock input coupled to a clock signal 304, its enable input coupled to the positive power supply terminal (VDD), and its measurement enable input (ME) coupled to the measure signal 313. With the power# input coupled to ground, the reliability oscillator 321 is always powered on when the integrated circuit is powered on.

Reliability oscillator 322 is a DC bias stressed oscillator. Reliability oscillator 322 has its power# input coupled to ground, its clock input coupled to ground, its enable input coupled to ground, and its measurement enable input (ME) coupled to a measure signal 313. With the power# input coupled to ground, the reliability oscillator 322 is always powered on when the integrated circuit is powered on. However with the clock input and the enable input being grounded, the reliability oscillator 322 does not receive AC bias stress from the clock signal 304.

Figure 5:
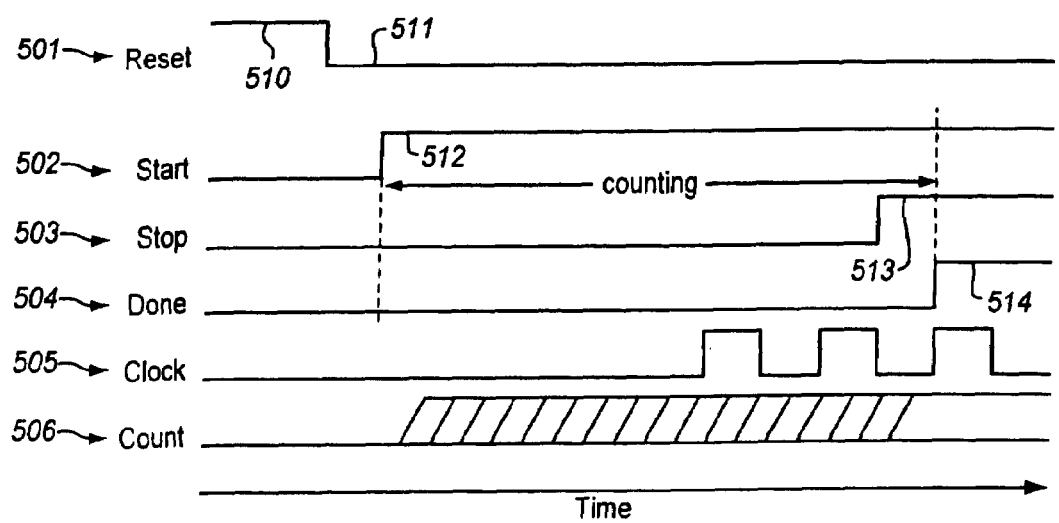
FIG. 5 illustrates a waveform diagram of waveforms of signals and circuit nodes of the block diagram of FIG. 3.

Operation of the frequency degradation circuit 300 is now described with reference to FIGS. 3 and 5. FIG. 5 illustrates a waveform diagram of waveforms 501-506 of circuit nodes and control signals of FIG. 3 versus time. Waveform 501 illustrates a waveform diagram of the reset signal 306. Waveform 502 illustrates a waveform diagram of the start signal 302. Waveform 503 illustrates a waveform diagram of the stop signal 316. Waveform 504 illustrates a waveform diagram of the done signal 314. Waveform 505 illustrates a waveform diagram of a clock signal 304. Waveform 506 illustrates a waveform diagram of exemplary of the counts 308, 310, and 312.

When the ring oscillators within each reliability oscillator 320-322 are to be measured, the counters 340-342 are first reset by the assertion of the reset signal 306 at 510. The reset signal 306 is then de-asserted at 511 and then the start signal 302 is asserted at 512. The measurement signal output 313 of the AND gate 326 goes high so that the measurement enable input is enabled for each reliability oscillator 320-322. The ring oscillator in each reliability oscillator 320-322 may then start oscillating and the counters 340-342 may then count the number of cycles. Before each counter 340-342, each prescaler 330-332 ("divided by N") reduces the frequency, by dividing by a predetermined number N, of the oscillating signal coupled into the input of each counter. This also reduces the likelihood of metastability in the synchronizer ("Sync") blocks. The divided output of each prescaler 330-332 is respectively coupled into the input of the counters 340-342 for counting.

Counter 340, the reference counter, counts the cycles of the reference ring oscillator of the reliability oscillator 320. Counter 341, the AC stress counter, counts the cycles of the AC biased ring oscillator of the reliability oscillator 321. Counter 342, the DC stress counter, counts the cycles of the DC biased ring oscillator of the reliability oscillator 322. If a counter overflows, the counter overflow ("CO") output is asserted.

The counter 340 counts until overflow is reached and the CO output is asserted as the stop signal 316. The reference oscillator of the reliability oscillator 320 may have a greater oscillating frequency than that of the degraded oscillators in the reliability oscillators 321-322. Thus, it is expected that counter 340 will overflow prior to the overflow of counters 341-342.

When counter 340 overflows, the stop signal 316 is asserted at 513, which is coupled into the synchronizers 344-345. The stop signal also disables counter 340 from counting further. The stop signal 316 is synchronized with the divided count value from each prescaler 331-332 and coupled to the enable input of counters 341-342 to respectively stop their counting. Each synchronized stop signal is also coupled into the inputs of the AND gate 346 to generate a done signal 314 at 514. The done signal 314 is inverted and de-asserts the measure signal 313 so that the oscillations of the ring oscillators are disabled as the measurement is completed. The logic around the reliability oscillators 320-322 generating the counts 308, 310, 312, including the logic generating the done signal 314 and the stop signal 316, is a state machine.

The count value held by each counter 341 and 342 provides a measure of the degradation from that of the reference ring oscillator. The synchronizers 344-345 allow the counters 341 and 342 to count for two extra cycles after the counter 340 of the reference ring oscillator has stopped counting. These two cycles may be subtracted before arithmetic is done to determine if degradation has been significant, or it can be used to simplify the arithmetic in generating a degradation signal 355.

For example, if the threshold of frequency degradation is selected to be 2% degradation, then the counters may be given a length of 100. If either oscillator fails to overflow before it is stopped by the reference oscillator, then it must have degraded by at least 2% (two synchronizer cycles divided by one hundred counts), and the core frequency should be reduced.

In any case, the compare circuit 350 compares the reference count 308 with the dynamic count 310 and the static count 312. If the compare circuit 350 detects that degradation has occurred over a predetermined threshold level, it generates the frequency degradation signal 355. In another embodiment, the compare logic used by the compare circuit 350 to generate the frequency degradation signal 355 may be that previously described with reference to FIG. 2.

The frequency degradation signal 355 may be coupled to a clock generator in order to reduce the clock frequency of the clock signal coupled to functional blocks in one embodiment. In another embodiment, the frequency degradation signal 355 may be used to adjust a ratio of clock frequency to bus frequency such as in a microprocessor. By operating the microprocessor at a lower frequency, it can continue to operate reliably in spite of the degraded performance of the transistors that have been aged over time and stress.

Figure 6:
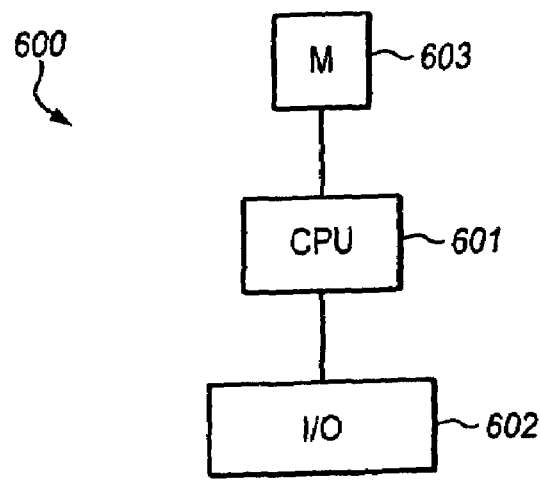
FIG. 6 illustrates a block diagram of a typical computer system in which embodiments of the invention may be utilized.

Referring now to FIG. 6, a block diagram of a typical computer 600 in which the embodiments of the invention may be utilized is illustrated. The computer 600 includes a central processing unit (CPU) 601, input/output devices (I/O) 602 such as keyboard, modem, printer, external storage devices and the like and monitoring devices (M) 603 such as a CRT or graphics display. The monitoring devices (M) 603 provide computer information in a human intelligible format such as visual or audio formats.

Figure 7:
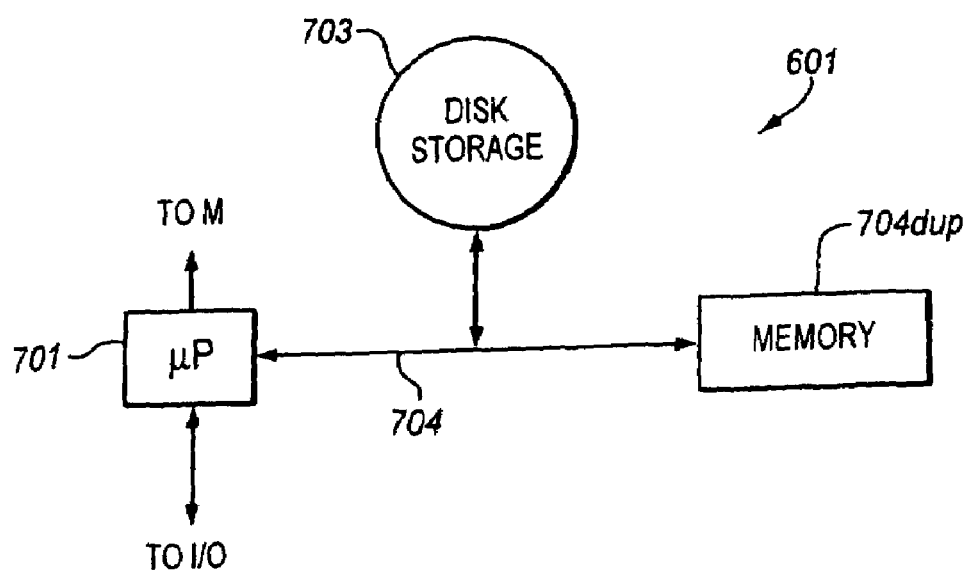
FIG. 7 illustrates a block diagram of a central processing unit in which embodiments of the invention may be utilized.

Referring now to FIG. 7, a block diagram of a typical central processing unit 601 in which the embodiments of the invention may be utilized is illustrated. The central processing unit 601 includes a microprocessor 701 including the embodiments of the invention, a disk storage device 703, and a memory 704 for storing program instructions coupled together. Disk storage device 703 may be a floppy disk, zip disk, DVD disk, hard disk, rewritable optical disk, flash memory or other non-volatile storage device. The microprocessor 701 and the disk storage device 703 can both read and write information into memory 704 over the memory bus 704. Memory 704 is typically dynamic random access memory (DRAM) but may be other types of rewritable storage.

The microprocessor 701 is an integrated circuit 100 in one embodiment as illustrated in FIG. 1 including the on-chip characterization circuitry or block 102 and the one or more functional circuits or blocks 104. In this case, at least one of the one or more functional circuits or blocks 104 may be an execution unit to execute one or more instructions. The one or more instructions may be from a software program for example.

Utilizing the embodiments of the invention, catastrophic failure of a microprocessor over time due to frequency degradation may be avoided. Embodiments of the invention can improve the prediction of mean times to failure so that a reduction in the frequency guard-band can be explored. Embodiments of the invention provide real-time on-chip degradation measurements to obtain degradation values and in response thereto, the clock frequency can be modified for that particular microprocessor over its lifetime. Embodiments of the invention can reduce the probability of failure due to frequency degradation to nearly zero.

While certain exemplary embodiments of the invention have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method comprising:
  enabling measurement of frequencies of three reliability oscillators;
  measuring a first frequency of a first reliability oscillator having non-stressed transistors;
  measuring a second frequency of a second reliability oscillator having stressed transistors;
  measuring a third frequency of the third reliability oscillator having dynamically stressed transistors;
  comparing the first frequency with the second frequency to determine a first measure of transistor degradation; and
  comparing the first frequency with the third frequency to determine a second measure of transistor degradation.

2. The method of claim 1, wherein the stressed transistors of the second reliability oscillator are dynamically stressed transistors.

3. The method of claim 1, wherein the stressed transistors of the second reliability oscillator are statically stressed transistors.

4. The method of claim 1, wherein
  the first reliability oscillator includes a first ring oscillator and the first frequency is a first ring oscillator frequency,
  the second reliability oscillator includes a second ring oscillator and the second frequency is a second ring oscillator frequency, and
  the third reliability oscillator includes a third ring oscillator and the third frequency is a third ring oscillator frequency.

5. The method of claim 1 further comprising: performing one or more functions with the functional blocks.

6. The method of claim 5, wherein
  the functional blocks include an execution unit to execute instructions; and
  the integrated circuit is a microprocessor.

7. The method of claim 1, wherein the first reliability oscillator and the second reliability oscillator have substantially similar circuits.

8. The method of claim 1, wherein
  the first reliability oscillator includes a first ring oscillator and the first frequency is a first ring oscillator frequency, and
  the second reliability oscillator includes a second ring oscillator and the second frequency is a second ring oscillator frequency.

9. The method of claim 7, wherein
  the second reliability oscillator has degraded transistors; and
  the first reliability oscillator has transistors without degradation.

10. The method of claim 1, wherein
  the comparing determines a new clock ratio, and
  if the new clock ratio is less than an initial clock ratio multiplied by a guard band, then the new clock ratio is output to a clock generator.

11. The method of claim 10, further comprising generating a clock signal using the new clock ratio.

12. A microprocessor integrated circuit comprising:
  one or more functional blocks to perform one or more functions; and
  a frequency compensation circuit including
    a reference reliability oscillator to selectively generate a reference oscillating signal,
    a dynamic reliability oscillator to generate an AC degraded oscillating signal,
    a static reliability oscillator to generate a DC bias degraded oscillating signal; and
    a measurement and comparison circuit coupled to the reliability oscillators, to receive the reference oscillating signal and the degrading oscillating signal to generate a first measure of transistor degradation.

13. The microprocessor integrated circuit of claim 12, wherein the degrading reliability oscillator is a dynamic reliability oscillator that selectively generates an AC degraded oscillating signal.

14. The microprocessor integrated circuit of claim 12, wherein the frequency compensation circuit further includes
the measurement and comparison circuit receiving the reference oscillating signal and the AC degraded oscillating signal to generate a second measure of transistor degradation.

15. The microprocessor integrated circuit of claim 14, wherein the measurement and compare circuit further to compare the first measure of transistor degradation with the second measure of transistor degradation to determine a worst transistor degradation.

16. The microprocessor integrated circuit of claim 15, wherein the measurement and compare circuit to generate a frequency compensation signal in response to the worst transistor degradation being greater than a predetermined level.

17. The microprocessor integrated circuit of claim 12, wherein each of the reliability oscillators includes a ring oscillator.

18. The microprocessor integrated circuit of claim 12, wherein the one or more functional blocks includes an execution unit to execute instructions.

* * * * *